United States Patent
Grisenthwaite

(10) Patent No.: US 8,677,107 B2
(45) Date of Patent: Mar. 18, 2014

(54) APPARATUS AND METHOD FOR HANDLING EXCEPTION EVENTS

(75) Inventor: Richard Roy Grisenthwaite, Nr Royston (GB)

(73) Assignee: ARM Limited, Cambridge (GB)

( * ) Notice: Subject to any disclaimer, the term of this patent is extended or adjusted under 35 U.S.C. 154(b) by 552 days.

(21) Appl. No.: 13/064,108

(22) Filed: Mar. 7, 2011

(65) Prior Publication Data

US 2011/0225402 A1 Sep. 15, 2011

(30) Foreign Application Priority Data

Mar. 15, 2010 (GB) .................................. 1004303.2

(51) Int. Cl.
*G06F 9/30* (2006.01)
(52) U.S. Cl.
USPC ........................................................ 712/244
(58) Field of Classification Search
USPC ........................................................ 712/244
See application file for complete search history.

(56) References Cited

U.S. PATENT DOCUMENTS

| | | | | |
|---|---|---|---|---|
| 4,488,227 | A * | 12/1984 | Miu et al. ....................... | 712/244 |
| 4,575,817 | A | 3/1986 | Allen et al. | |
| 4,866,599 | A | 9/1989 | Morganti et al. | |
| 5,673,408 | A * | 9/1997 | Shebanow et al. ............ | 712/216 |
| 6,490,509 | B1 | 12/2002 | Sato et al. | |
| 6,757,771 | B2 * | 6/2004 | Christie ........................ | 710/260 |
| 2007/0266374 | A1 | 11/2007 | Grisenthwaite et al. | |

FOREIGN PATENT DOCUMENTS

| | | |
|---|---|---|
| GB | 2 369 464 | 5/2002 |
| GB | 2461848 | 1/2010 |

OTHER PUBLICATIONS

UK Combined Search and Examination Report dated Jul. 29, 2013 in GB 1312124.9.
International Preliminary Report on Patentability mailed Sep. 27, 2012 in PCT/GB2011/050389.
International Search Report and Written Opinion of the International Searching Authority mailed Jun. 7, 2011 in PCT/GB2011/050389.
GB Search Report for GB Application No. 1004303.2, dated Jul. 5, 2010.

* cited by examiner

*Primary Examiner* — Robert Fennema
(74) *Attorney, Agent, or Firm* — Nixon & Vanderhye P.C.

(57) ABSTRACT

Processing circuitry 4 has a plurality of exception states EL0-EL3 for handling exception events, the exception states including a base level exception state EL0 and at least one further level exception state EL1-EL3. Each exception state has a corresponding stack pointer indicating the location within the memory of a corresponding stack data store 35. When the processing circuitry is in the base level exception state EL0, stack pointer selection circuitry 40 selects the base level stack pointer as a current stack pointer indicating a current stack data store for use by the processing circuitry 4. When the processing circuitry 4 is a further exception state, the stack pointer selection circuitry 40 selects either the base level stack pointer or the further level stack pointer corresponding to the current further level exception state as a current stack pointer.

17 Claims, 9 Drawing Sheets

MSR    SPSel,   #Imm 1

|  |  | Synchronous | IRQ | FIQ | Error |
|---|---|---|---|---|---|
| From lower EL | mode 0 | 0 | 0×10 | 0×20 | 0×30 |
|  | mode 1 | 0×40 | 0×50 | 0×60 | 0×70 |
| From current EL with SPx |  | 0×80 | 0×90 | 0×A0 | 0×B0 |
| From current EL with SP0 |  | 0×C0 | 0×D0 | 0×E0 | 0×F0 |

FIG. 6

APPARATUS AND METHOD FOR HANDLING EXCEPTION EVENTS

This application claims priority to GB Application No. 1004303.2, filed 15 Mar. 2010, the entire contents of which is hereby incorporated by reference.

BACKGROUND OF THE INVENTION

1. Field of the Invention

The present invention relates to the field of data processing. More particularly, the invention relates to an apparatus and method for handling exception events.

2. Description of the Prior Art

While data processing is being carried out, an exception event may occur, indicating that the data processing should be interrupted so that an exception handling routine can be performed. Exception events can indicate, for example, that a processing result is undefined, that a processing resource has overflowed, or that an exception signal has been received from an external device. It is possible to process exception events in multiple exception states. Each exception state can have a different priority level and different resources associated with it.

It can be useful to provide each exception state with its own stack data store for storing temporary variables while processing an exception handling routine in the exception state. The stack data store is typically stored in a memory and is a first-in-first-out (FIFO) data structure. The stack data store has a predetermined amount of memory space allotted to it. If too much data is stored on the stack, then the stack may exceed its allocated memory space. The stack may overrun a page boundary and may not have the access rights for accessing the next page in memory, thus triggering a memory abort. Also, if the processor tries to store on the stack a variable that is larger than the remaining space in the stack, then this can cause an error. These kinds of errors are known as stack overflows. Generally, a stack overflow is any error associated with overuse of the stack that prevents a data value being stored on the stack.

Typically, one of the first tasks performed by an exception handling routine after an exception event is to push some variables onto a stack. It is therefore important that stack capacity is available to the exception handling routine on taking an exception, to ensure that the exception handling routine can be started successfully. If the stack overflows, then this could prevent the exception handling routine being executed properly, since the stack overflow may itself trigger an exception event which causes another exception handling routine to try to push variables onto the stack, causing another stack overflow exception event. This can result in an endless loop of exception events each trying to load variables onto the stack and each triggering a further exception event due to the stack overflow, and can cause the system to crash due to such recursive exception entry. The present technique seeks to reduce the likelihood of such crashes.

SUMMARY OF THE INVENTION

Viewed from one aspect, the present invention provides a data processing apparatus comprising:

processing circuitry configured to process data, said processing circuitry having a plurality of exception states, said exception states including a base level exception state and at least one further level exception state;

at least one exception return register for storing exception return data for controlling the processing circuitry to return from handling an exception event, the at least one further level exception state each having a corresponding exception return register dedicated for use by the processing circuitry when in the corresponding further level exception state;

a base level stack pointer register for storing a base level stack pointer for use when said processing circuitry is in any of said exception states, said base level stack pointer indicating the location within a memory of a base level stack data store;

at least one further level stack pointer register for storing at least one further level stack pointer, each further level stack pointer being dedicated for use when said processing circuitry is in a corresponding further level exception state and indicating the location within said memory of a corresponding further level stack data store; and stack pointer selection circuitry configured to select a current stack pointer and to control said processing circuitry to use a current stack data store indicated by said current stack pointer when processing data; wherein:

when said processing circuitry is in said base level exception state, said stack pointer selection circuitry is configured to select said base level stack pointer as said current stack pointer; and when said processing circuitry is in one of said at least one further level exception state, said stack pointer selection circuitry is configured to select one of said base level stack pointer and the further level stack pointer corresponding to a current further level exception state as said current stack pointer, said processing circuitry continuing to use the exception return register corresponding to said current further level exception state irrespective of whether said current stack pointer is said base level stack pointer or said further level stack pointer.

An apparatus is provided comprising processing circuitry having a plurality of exception states. The exception states include a base level exception state and at least one further level exception state. In one embodiment, the base level exception state is for processing user applications, while exception events result in an exception handling routine being processed in a targeted one of the further level exception states (although in an alternative embodiment exception events could also be targeted at the base level exception state). At least the further level exception states have a corresponding exception return register for storing exception return data for controlling a return to a previous process after handling an exception event (if the base level exception state is used for processing an exception handling routine, then the base level exception state may also have a corresponding exception return register).

The apparatus also has registers for storing stack pointers indicating the locations within a memory of multiple stack data stores for use by the processing circuitry for use when handling exception events. When the processing circuitry is in the base level exception state, a base level stack data store indicated by a base level stack pointer is used to store temporary variables. The risk of stack overflow leading to recursive exception entry (and hence the risk of an exception event not being handled correctly) is reduced by providing two stack data stores accessible to the processing circuitry. When processing in any further level exception state one may be used for a small amount of processing immediately on taking the exception, and the other being used for more general processing within the exception state. Each further level exception state has access to both the base level stack pointer and a corresponding further level stack pointer dedicated for use by the corresponding further level exception state. During a small amount of processing immediately on taking an exception, the contents of the base level stack pointer (together with the contents of the general purpose registers) are saved in memory, and a new value is placed in the base level stack pointer, which points to a stack suitable for more general purpose processing. This stack suitable for more general purpose processing with that exception state is referred to as the base level stack data store used with that exception state. Selection circuitry is provided to select between a base level stack pointer indicating the location of the base level stack data store used with that exception state and a further level stack pointer indicating the location of the further level stack data store when the processing circuitry is in one of the further level exception states, and to control the processing circuitry to use the currently selected stack pointer to access one of the stack data stores in memory.

Since each further level stack pointer is dedicated for use by a particular further level exception state, each further level stack pointer is used relatively infrequently and so few variables will be stored on the further level stack data store. This means that the risk of stack overflow is reduced and that it is more likely that the further level stack data store will be available for storing variables when processing an exception event in the corresponding further level exception state. On the other hand, the base level stack pointer is a shared stack pointer which is used for processing in any exception state. The base level stack pointer can be used to point to the base level stack data store used with the exception state, for example, when safe initiation of the exception handling routine has already occurred or is no longer critical, in order to conserve the resources of the dedicated further level stack data store. By using the base level stack data store whenever possible, the likelihood of one of the further level stack data stores overflowing is significantly reduced.

While the protection against stack overflow could have been achieved by providing two dedicated stack pointers per further level exception state, the present technique recognises that this approach would be inefficient since each stack pointer would be used less frequently and so it is wasteful of hardware. Protection against stack overflow can be achieved in a more efficient way by providing a stack pointer corresponding to each exception state, and allowing the base level stack pointer to be shared between the exception states so that each further level exception state can access either its own base level stack data store or a further level stack data store. Hence, each further level exception state still has access to two stack data stores in order to provide protection against stack overflow, but just one stack pointer per exception state is provided. Thus there can be two stack stores used for each exception level—one used immediately on exception entry, and one for more general processing (and which could be allowed to overflow without risk of recursive exception entry).

The exception return registers and stack pointer registers may collectively be considered as exception context registers provided for storing context data for use while handling exception events. The exception return registers are banked in a different way to the stack pointer registers because each exception return register is dedicated for use by a particular exception state, in contrast to the stack pointer registers where the base level stack pointer register is provided for use in any of the exception states.

The stack pointer selection circuitry may be responsive to an exception event associated with a target further level exception state to select the further level stack pointer corresponding to the target further level exception state as the current stack pointer. Hence, on starting processing of the exception event, the current stack data store will become the dedicated further level stack data store corresponding to the target further level exception state. The risk of stack overflow of the dedicated further level stack data store is lower than the risk of overflow of the base level stack data store used with that exception level. Therefore, switching to the target further level stack data store on exception entry reduces the risk of the exception event entry not being handled correctly. Once the entry has been made a switch back to using a stack pointed to by a new value in the base level stack pointer may be made.

The processing circuitry may be responsive to the exception event to process the exception handling routine in the target further level exception state, and the stack pointer selection circuitry may be configured to switch the current stack pointer from the further level stack pointer corresponding to the target further level exception state to the base level stack pointer after the processing circuitry has completed an initial portion of the exception handling routine. After the initial portion of the exception handling routine has been completed, then this indicates that exception processing has started successfully and so the use of the further level stack data store indicated by the further level stack pointer is no longer required. To avoid too much data being pushed onto the further level stack data store, the current stack pointer can be switched back to the base level stack pointer and processing can continue using the base level stack data store used with, the exception state, as indicated by the base level stack pointer. This reduces the probability of the further level stack overflowing on entry to another exception event at the same further level exception state.

Various techniques for indicating the end of the initial portion of the exception handling routine can be used. For example, a counter can be provided for counting the number of processing cycles which have elapsed since the beginning of the exception handling routine, or the number of instructions which have been executed since the exception handling routine started, and the initial portion could end when the counter reaches a predetermined threshold value.

However, a useful way of indicating the end of the initial portion of the exception handling routine is by providing an instruction within the exception handling routine for controlling the stack pointer selection circuitry to switch the current stack pointer from the further level stack pointer corresponding to the target further level exception state to the base level stack pointer. Thus, the software representing the exception handling routine can itself define the point at which the current stack pointer is switched to the base level stack pointer. Since some exception handling routines may be more safety critical than other exception handling routines, then providing this instruction allows the programmer of the exception handling routines to decide on a case-by-case basis how long the safe further level stack pointer should be used before switching to the base level stack pointer.

The apparatus may comprise a stack pointer selection register configured to store a stack pointer selection value indicating whether the current stack pointer is a base level stack pointer or the further level stack pointer corresponding to the current further level exception state. Other parts of the apparatus can then determine which stack pointer is currently being used by reading the value stored in the stack pointer selection register.

As well as indicating which of the base level stack pointer or the further level stack pointer is currently active, when the processing circuitry is in one of the further level exception states the stack pointer selection register may also control the operation of the stack pointer selection circuitry. The stack pointer selection circuitry may be configured to select the current stack pointer in dependence on the stack pointer selection value stored in the stack pointer selection register. Thus, modifying the value stored in the stack pointer selection register changes which of the stack data stores in memory is used by the processing circuitry.

The stack pointer selection circuitry may be configured such that, when the processing circuitry is in one of the further level exception states, the base level stack pointer is selected as the current stack pointer when the stack pointer selection value has a first value, and the further level stack pointer corresponding to the current further level exception state is selected as the current stack pointer when the stack pointer selection value has a second value. For example, the stack pointer selection value could be a one-bit value where a first value (0 or 1, say) controls the stack pointer selection circuitry to select the base level stack pointer as the current stack pointer, and a second value (the other of 0 and 1) controls the stack pointer selection circuitry to select the further stack pointer corresponding to the current exception state as the current stack pointer.

The processing circuitry may be responsive to a stack pointer selection instruction to write an updated stack pointer selection value to the stack pointer selection register. This allows the programmer of a program or exception handling routine to control which stack is used when. By executing the stack pointer selection instruction, an updated stack pointer selection value representing the desired stack pointer is written to the stack pointer selection register and the stack pointer selection circuitry then selects the desired stack pointer as the current stack pointer and controls the processing circuit to use the stack data store indicated by the updated current stack pointer.

The apparatus may comprise an exception controller responsive to the stack pointer selection value stored in the stack pointer selection register to control which of a plurality of different exception handling routines corresponding to a particular exception event is selected for execution by the processing circuitry. The stack pointer selection register indicates a current state of the processor (that is, whether a shared base level stack pointer or a dedicated further level stack pointer is being used), and so when a base level stack data store for the exception state is being used, a different exception handling routine may be selected compared to when the further level stack pointer is being used.

For example, when the plurality of corresponding exception handling routines includes a stack overflow handling routine for handling a stack overflow of the at least one further stack data store, then it can be useful to choose the one of the corresponding exception handling routines in dependence upon the stack pointer selection value. Although the present technique reduces the risk of overflow of the further level exception stack data stores, there is still a small possibility, for example as a result of an error in the software, of a stack overflow, and the stack overflow handling routine may be provided to deal with this rare situation. When an exception event is targeted at a target further level exception state that is the same as the current further level exception state and the stack pointer selection value indicates that the further level stack pointer is the current stack pointer, then this can indicate that there is a risk of a stack overflow of the further level stack associated with the current level exception state, i.e. recursive exception entry. There is a risk of stack overflow because the stack pointer selection value indicating that the further level stack pointer is the current stack pointer shows that the exception event was issued before a previously executed exception handling routine reached the point at which the base level stack data store is used, and since the new exception event is targeted at the same exception state as the previous exception state then a possible cause of the new exception event is overflow of the further level stack data store. Entry into a normal exception handling routine could therefore trigger an endless loop whereby exceptions are called but the corresponding exception handling routine cannot be executed because the stack has overflowed. To guard against this situation then the stack overflow handling routine is selected.

The memory storing the stack data stores may be an external memory which is not part of the processing apparatus. In this case, the stack pointers processed by the apparatus indicate the locations of the corresponding stack data store within the external memory. Alternatively, the data processing apparatus may itself comprise the memory. The memory may comprise one or more banks of memory or one or more discrete memory devices, so may include any group of memory devices which collectively store the base level stack data store and one or more further level stack data stores.

Viewed from another aspect, the present invention provides a data processing apparatus comprising:

processing means for processing data, said processing means having a plurality of exception states, said exception states including a base level exception state and at least one further level exception state;

at least one exception return register means for storing exception return data for controlling the processing means to return from handling an exception event, the at least one further level exception state each having a corresponding exception return register means dedicated for use by the processing means when in the corresponding further level exception state;

a base level stack pointer register means for storing a base level stack pointer for use when said processing means is in any of said exception states, said base level stack pointer indicating the location within a memory means of a base level stack data store means;

at least one further level stack pointer register means for storing at least one further level stack pointer, each further level stack pointer being dedicated for use when said processing means is in a corresponding further level exception state and indicating the location within said memory means of a corresponding further level stack data store means; and stack pointer selection means for selecting a current stack pointer and for controlling said processing means to use a current stack data store means indicated by said current stack pointer when processing data; wherein:

when said processing means is in said base level exception state, said stack pointer selection means is configured to select said base level stack pointer as said current stack pointer; and when said processing means is in one of said at least one further level exception state, said stack pointer selection means is configured to select one of said base level stack pointer and the further level stack pointer corresponding to a current further level exception state as said current stack pointer, said processing means continuing to use the exception return register means corresponding to said current further level exception state irrespective of whether said current stack pointer is said base level stack pointer or said further level stack pointer.

Viewed from a further aspect, the present invention provides a method of data processing comprising the steps of:

processing data in one of a plurality of exception states, said exception states including a base level exception state and at least one further level exception state;

in response to an exception event, storing in at least one exception return register exception return data for controlling a return from handling the exception event, the at least one further level exception state each having a corresponding exception return register dedicated for use when processing in the corresponding further level exception state;

storing a base level stack pointer for use when said processing step is in any of said exception states, said base level stack pointer indicating the location within a memory of a base level stack data store;

storing at least one further level stack pointer, each further level stack pointer being dedicated for use when said processing step is in a corresponding further level exception state and indicating the location within said memory of a corresponding further level stack data store; and selecting a current stack pointer and controlling said processing step to use a current stack data store indicated by said current stack pointer when processing data; wherein:

when said processing step processes data in said base level exception state, said selecting step selects said base level stack pointer as said current stack pointer; and when said processing step processes data in one of said at least one further level exception state, said selecting step selects one of said base level stack pointer and the further level stack pointer corresponding to a current further level exception state as said current stack pointer, said processing step continuing to use the exception return register corresponding to said current further level exception state irrespective of whether said current stack pointer is said base level stack pointer or said further level stack pointer.

Viewed from a further aspect, the present invention provides a data processing apparatus comprising:

processing circuitry configured to process data in one of a plurality of exception states including a base level exception state and at least one further level exception state;

a base level stack pointer register for storing a base level stack pointer indicating the location within a memory of a base level stack data store;

at least one further level stack pointer register for storing at least one further level stack pointer indicating the location within said memory of at least one further level stack data store, the at least one further level exception state each having a corresponding further level stack pointer; and an exception controller responsive to an exception event associated with a target further level exception state to trigger said processing circuitry to process an exception handling routine in said target further level exception state using the further level stack data store indicated by the further level stack pointer corresponding to said target further level exception state;

wherein said processing circuitry is configured, after processing an initial portion of said exception handling routine, to process a remainder of said exception handling routine in said target further level exception state using said base level stack data store indicated by said base level stack pointer.

By using the further level stack pointer following entry into a target further level exception state, the corresponding exception handling routine is provided with a dedicated, infrequently used, stack to ensure that the exception handling routine is safely initiated. After an initial portion of the exception handling routine has been completed, a remainder of the exception handling routine is then processed in the target further level exception state using a base level stack data store for that exception level as indicated by the base level stack pointer. Using the base level stack pointer once the exception handling routine has safely started avoids overuse of the dedicated, further level stack data store, and so reduces the likelihood of overflow of the further level stack data store.

Viewed from yet another aspect, the present invention provides a data processing apparatus comprising:

processing means for processing data in one of a plurality of exception states including a base level exception state and at least one further level exception state;

a base level stack pointer register means for storing a base level stack pointer indicating the location within a memory means of a base level stack data store means;

at least one further level stack pointer register means for storing at least one further level stack pointer indicating the location within said memory means of at least one further level stack data store means, the at least one further level exception state each having a corresponding further level stack pointer; and exception controlling means for triggering, in response to an exception event associated with a target further level exception state, said processing means to process an exception handling routine in said target further level exception state using the further level stack data store means indicated by the further level stack pointer corresponding to said target further level exception state;

wherein said processing means is configured, after processing an initial portion of said exception handling routine, to process a remainder of said exception handling routine in said target further level exception state using said base level stack data store means indicated by said base level stack pointer.

Viewed from another aspect, the present invention provides a method of data processing comprising the steps of:

processing data in one of a plurality of exception states including a base level exception state and at least one further level exception state;

storing a base level stack pointer indicating the location within a memory of a base level stack data store;

storing at least one further level stack pointer indicating the location within said memory of at least one further level stack data store, the at least one further level exception state each having a corresponding further level stack pointer;

in response to an exception event associated with a target further level exception state, triggering processing of an exception handling routine in said target further level exception state using the further level stack data store indicated by the further level stack pointer corresponding to said target further level exception state; and after processing an initial portion of said exception handling routine, processing a remainder of said exception handling routine in said target further level exception state using said base level stack data store indicated by said base level stack pointer.

The above, and other objects, features and advantages of this invention will be apparent from the following detailed description of illustrative embodiments which is to be read in connection with the accompanying drawings.

BRIEF DESCRIPTION OF THE DRAWINGS

FIG. 6 illustrates a exception vector table indicating respective address offsets for accessing exception handling routines;

DESCRIPTION OF THE EMBODIMENTS

Figure 1:
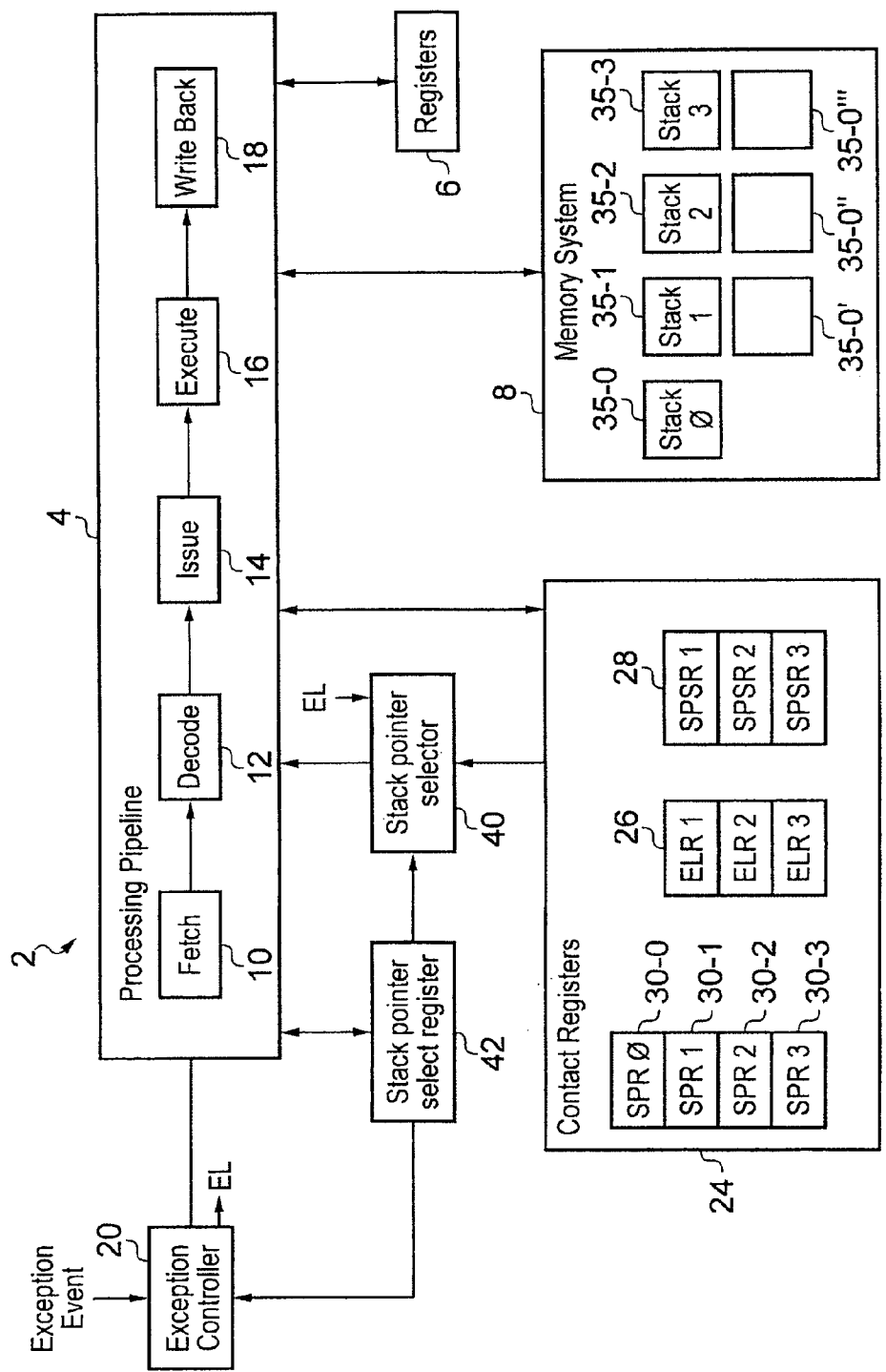
FIG. 1 schematically illustrates a data processing apparatus having exception handling resources for handling exception events.

FIG. 1 illustrates a data processing apparatus 2 having exception handling resources. The data processing apparatus 2 comprises a processing pipeline 4 for processing data stored in registers 6 or a memory system 8 under control of instructions loaded from the memory system 8. The processing pipeline 4 may comprise various pipeline stages, such as a fetch pipeline stage 10 for fetching instructions from the memory system 8; a decode pipeline stage 12 for decoding the fetched instructions, an issue stage 14 for issuing instructions for execution (the issue stage 14 may issue one instruction or multiple instructions per processing cycle, and may issue instructions in order or out of order); an execution stage 16 for executing the issued instructions; and a write back stage 18 for writing back processing results to the registers 6. The processing pipeline 4 is not limited to these stages and may include other stages, for example, a rename stage for renaming register specifiers specified in the instructions.

Figure 2:
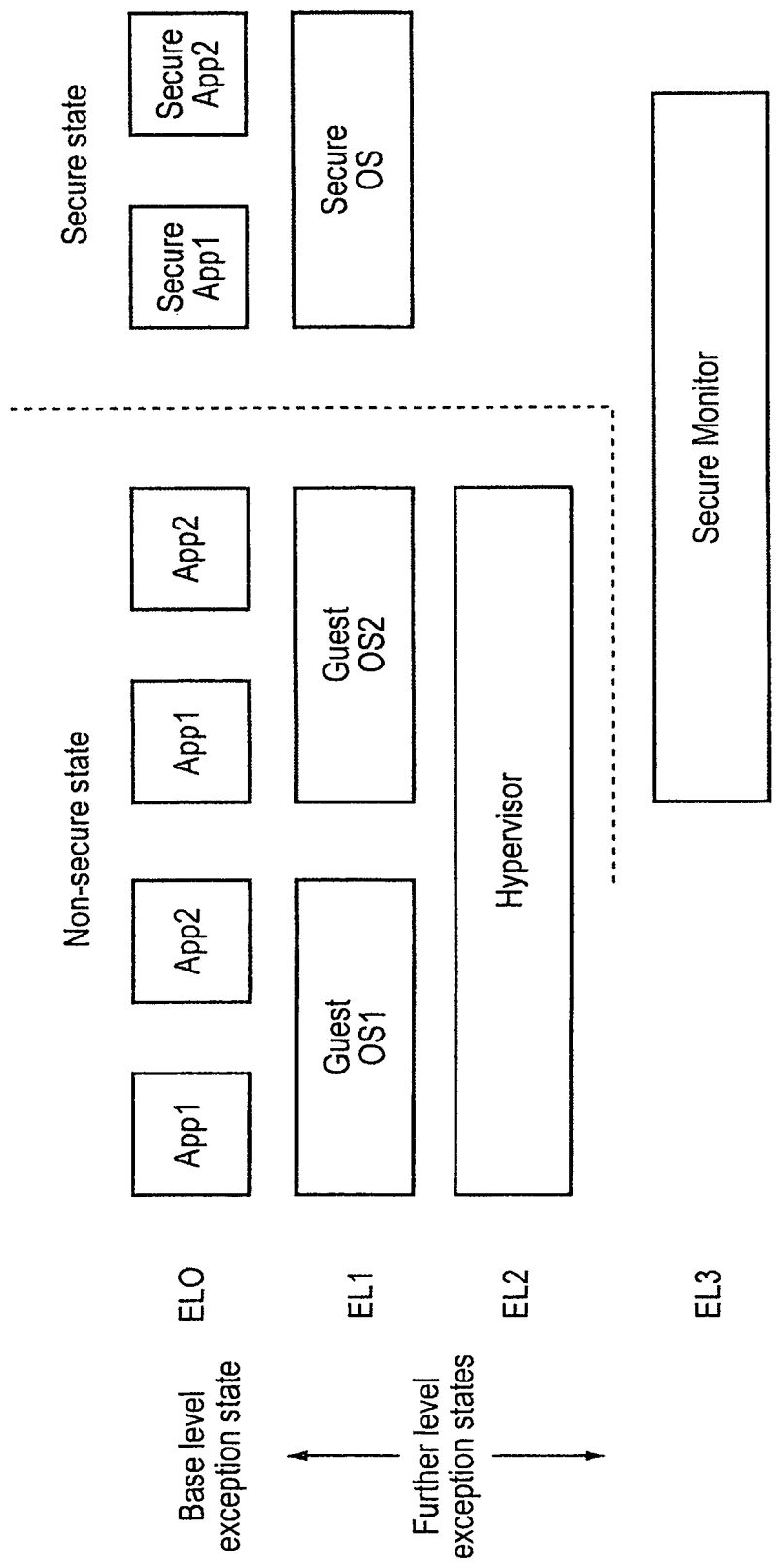
FIG. 2 illustrates a plurality of exception states of the processing apparatus.

The apparatus 2 comprises an exception controller 20 which is responsive to one or more kinds of exception event to control the processing pipeline 4 to process an exception handling routine. The processing pipeline 4 has multiple exception states for handling exception events. Each exception state has different properties. For example, in the example embodiment shown in FIG. 2, the base level exception state EL0 is a user level exception state, a first further level exception state EL1 is an operating system level exception state, a second further level exception state EL2 is a hypervisor level exception state and a third further level exception state EL3 is a secure monitor level exception state. Within each exception state, there may be multiple modes, such as a non-secure mode and a secure mode as shown in FIG. 2. Not all exception states need to be available in both modes. For example, in FIG. 2 the further level exception state EL2 is available only in the non-secure state whereas the further level exception state EL3 is available only in the secure state. The exception state diagram of FIG. 2 is merely an example embodiment and other numbers and configurations of exception states are possible.

Each exception event is targeted at a particular one of the further level exception states EL1-EL3. For example, a particular exception event may require processing in the operating system level exception state EL1 or the hypervisor level exception state EL2 and can be targeted at the appropriate level. The exception controller 20 then controls the processing pipeline 4 to process a corresponding exception handling routine in the target level exception state. The exception events may be prioritized so that an exception event targeted at the current or higher exception state may pre-empt or interrupt execution in a given exception state, and cause execution in the target exception state. On the rare occasions that exceptions targeted at a low exception state occur using execution at a given exception state, those exceptions are either ignored if it is safe to do so, or otherwise pre-empt execution and cause execution of a handler in the current exception level. An exception event targeted at the same level exception state as the current level exception state would not usually interrupt a current process, but could be taken if the exception event was caused directly by a problem which has halted the current process.

Referring once more to FIG. 1, the apparatus 2 comprises a number of context registers 24 for storing exception context data used when handling exception events. The context registers 24 include a number of exception return registers including exception link registers (ELR) 26 and saved process state registers (SPSR) 28. At least the further level exception states (that is, all the exception states other than the base level exception state EL0) have a corresponding exception return register (exception link register 26 and saved process state register 28 can collectively be considered to represent an exception return register). Each exception link register 26 stores an exception return address indicating the instruction to be processed once an exception handling routine being processed in the corresponding further level exception state has been completed. Each saved process state register 28 stores various context state data such as interrupt masks, flags, or execution masks, for use when processing the exception handling routine in the corresponding further level exception state. In the embodiment of FIG. 1, the base level exception state EL0 does not have a corresponding exception link register 26 or saved process state register 28, since it is envisaged that exception events will be targeted at one of the further level exception states. However, in embodiments in which the exception events can be handled in the base level exception state as well, then the base level exception state EL0 can also have a corresponding exception link register 26 or saved process state register 28.

The context registers 24 also include stack pointer registers 30. Each of the exception states has a corresponding stack pointer register 30 indicating the location within the memory system 8 of a corresponding stack data store 35. The base level stack pointer register 30-0 identifies the location within the memory system 8 of base level stack data stores 35-0, 35-0', 35-0" and 35-0'" which is accessible while the processing pipeline 4 is in any of the exception states EL0-EL3. In contrast, the further level stack pointer registers 30-1, 30-2, 30-3 identify a corresponding further level stack data store 35-1, 35-2, 35-3 in the memory system 8 and are each dedicated for use when the processing pipeline 4 is in the corresponding further level exception state EL1, EL2, EL3.

It will be appreciated by those skilled in the art that while the base level stack data stores 35-0 . . . 35-0'" are referred to as base level stack data stores, it is not appropriate that a base level stack data store used with an exception state is accessible to execution in a lower exception state.

Stack pointer selection circuitry 40 is provided to select which of the stack pointers 30 is currently in use. When the processing pipeline 4 is in the base level exception state EL0, the base level stack pointer stored in the base level stack pointer register 30-0 is selected and the processing pipeline 4 controlled by the selection circuitry 40 to use the base level stack 35-0 to store variables.

When the processing pipeline 4 is in one of the further level exception states EL1-EL3, the stack pointer selection circuitry 40 is responsive to a stack pointer selection value stored in a stack pointer selection register 42 to select either a base level stack pointer stored in the base level stack pointer register 30-0 and corresponding to a respective one of the base level stack data stores 35-0', 35-0" and 35-0'", or the further level stack pointer stored in the one of the stack pointer registers 30-1, 30-2, 30-3 that corresponds to the current exception state of the processing pipeline 4. The stack pointer selection circuitry 40 may receive a signal from the exception controller 20 indicating the current exception state of the processing pipeline 4. Alternatively, the processing pipeline 4 can inform the stack pointer selection circuitry 40 of its current exception state. Depending on the value stored in the stack pointer selection register 42 and the current exception state, the current stack pointer is selected and the processing pipeline 4 is then controlled by the stack pointer selection circuitry 40 to use the current stack pointer to access the corresponding one of the stack data stores 35.

By providing each further level exception state with access to two different stacks (one of base level stacks 35-0', 35-0" or 35-0'" and one of the further level stacks 35-1, 35-2, 35-3), a safe dedicated stack is provided for each further level exception state to enable an exception handler running in that exception state to be initiated safely without risk of overflowing the stack, while a respective base level stack 35-0', 35-0" or 35-0'" can be used for general processing in that exception level. Wherever possible, a base level (general purpose) stack 35-0' 35-0" or 35-0'" is used to avoid overburdening the dedicated stack and leaving room on the dedicated stack free for use on entry into an exception handler.

Figure 3:
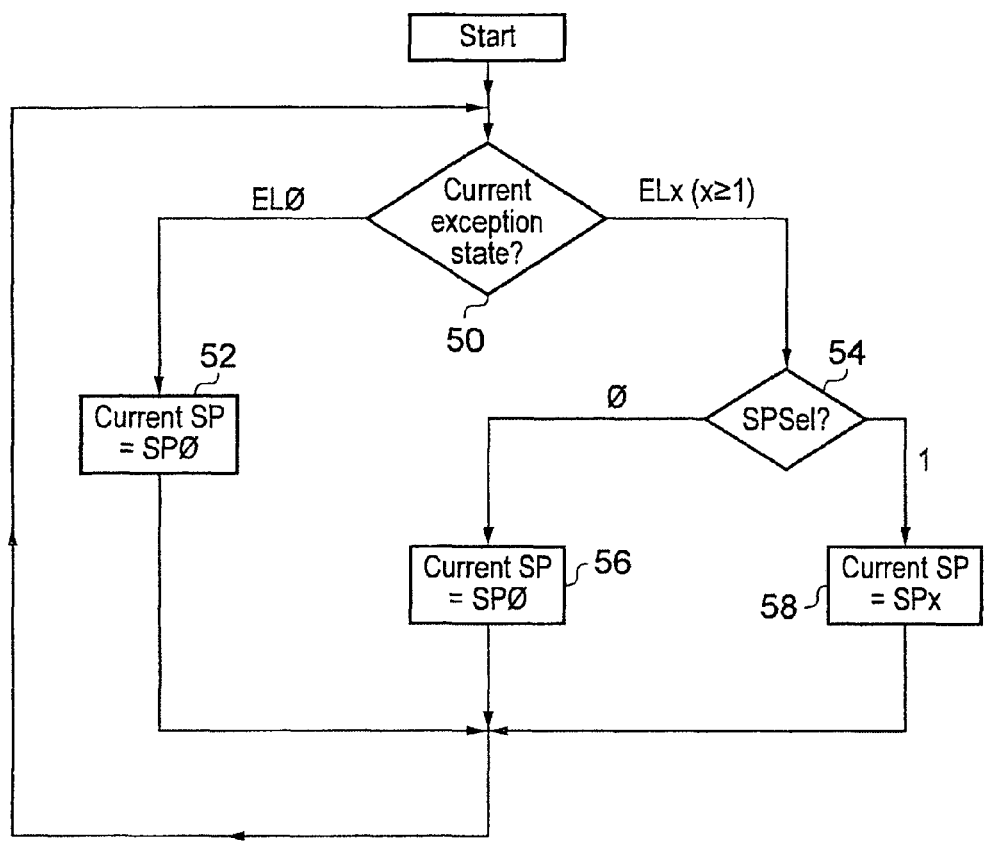
FIG. 3 illustrates a technique for selecting a current stack pointer from a base level stack pointer and at least one further level stack pointer.

The stack pointer selection register 42 may store a stack pointer selection value having two possible values. When the stack pointer selection value has a first value (for example, a value of zero), then the stack pointer selection circuitry can select the base level stack pointer stored in the base level stack pointer register 30-0 as the current stack pointer. On the other hand, when the stack pointer selection value has a second value (for example, a value of one), then the stack pointer selection circuitry 40 can select the further level stack pointer associated with the current further level exception state as the current stack pointer. FIG. 3 illustrates an example of the operation of the stack pointer selection circuitry 40 when this mapping of the stack pointer selection value is used. After starting processing, at step 50 the stack pointer selection circuitry 40 checks the current exception state of the processing pipeline 4. As mentioned above, this could be by means of an exception level signal provided from the exception controller 20. If at step 50 the current exception state is determined to be the base level exception state EL0 then the method proceeds to step 52 at which the stack pointer selection circuitry 40 selects the base level stack pointer stored in the base level stack pointer register 30-0 as the current stack pointer. The processing pipeline 4 is then controlled to use the base level stack 35-0 as the current stack data store. On taking an exception into an exception state, the SPSel is arranged to select the dedicated exception stack pointer.

On the other hand, if at step 50 the stack pointer selection circuitry 40 determines that the current exception state is one of the further level exception states ELx (where x is any integer greater than, or equal to, one), then the method proceeds to step 54 where the stack pointer selection circuitry 40 reads the stack pointer selection value stored in the stack pointer selection register 42. In this embodiment, if the stack pointer selection value is zero then the method proceeds to step 56 at which the base level stack pointer is selected to be current stack pointer and the processing pipeline 4 is controlled to use the base level stack 35-0. On the other hand, if at step 54 the stack pointer selection value has a value of one, then the method proceeds to step 58 at which the stack pointer SPx corresponding to the current further level exception state ELx is selected as the current stack pointer and the processing pipeline 4 is controlled to use to the stack data store 35-x corresponding to the current exception state as the current stack data store.

Hereafter, when the processing pipeline 4 requires a stack pointer then the stack pointer selection circuitry 40 provides the current stack pointer to the processing pipeline 4 (either as the stack pointer value corresponding to the current stack pointer, or as a reference to the one of the stack pointer registers 30 storing the current stack pointer).

Whichever stack pointer is the current stack pointer, processing continues for each instruction unless pre-empted by an exception.

Figures 4, 5:
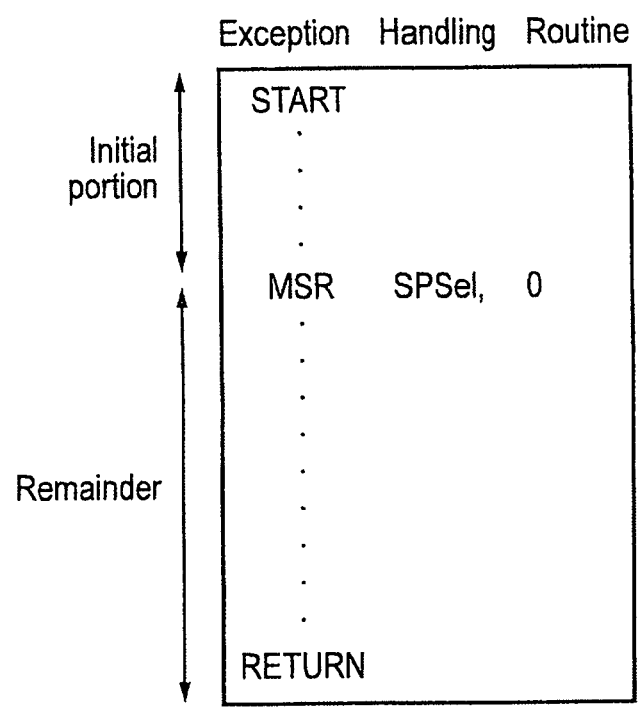
FIG. 4 illustrates a stack pointer selection instruction.
FIG. 5 illustrates an exception handling routine comprising the stack pointer selection instruction.

As shown in FIG. 3, when the processing pipeline 4 is in one of the further level exception states, then the stack pointer selection register 42 controls which stack pointer is the current stack pointer. The value stored in the stack pointer selection register 42 can be modified by a stack pointer selection instruction executed by the processing pipeline 4. FIG. 4 shows an example syntax of the stack pointer selection instruction. The stack pointer selection instruction includes a register specifier SPSel specifying the location of the stack pointer selection register 42 and an immediate value #Imm1 specifying an immediate value to be written to the stack pointer select register 42. For example, when the immediate value is 0 then this can set the stack point select register 42 to control the stack pointer selection circuitry 40 to select the base level stack pointer as the current stack pointer, whereas when the immediate value is 1 then this can control the stack pointer selection register 42 to control the stack pointer selection circuitry 40 to select one of the further level stack pointers as the current stack pointer. Of course, the mapping between the values 0 and 1 and the base level and further level stack pointers could be reversed. The stack pointer selection instruction may directly modify the stack pointer selection register 42 without the immediate value being written to the register bank 6. Alternatively, the stack pointer selection instruction may require the immediate value to be written to the register bank 6 before the immediate value is written to the stack pointer selection register 42.

By providing the stack pointer selection instruction shown in FIG. 4, the programmer is able to include the stack pointer selection instruction in an exception handling routine to control the point at which the current stack data store is switched from the further level stack data store 35-1, 35-2, 35-3 to the respective base level stack data store 35-0', 35-0" or 35-0'" for the exception level. As shown in FIG. 5, such an exception handling routine comprises an initial portion where one of the further level stack data stores 35-1, 35-2, 35-3 is used as the current stack data store, and a remainder where the base level stack data store 35-0 is used as a current stack data store. The location within the exception handling routine of the stack pointer selection instruction determines the relative sizes of the initial portion and the remainder and can be varied as required in dependence upon the extent to which a dedicated stack is required for processing the exception event safely. The initial portion of the exception handling routine uses the further level stack data store in order to provide a safe dedicated stack storage for initiating processing of the exception handling routine, while the remainder of the exception handling routine uses the relevant base level stack data store for that exception level to avoid overburdening the dedicated stack.

The stack pointer selection register 42 can also be useful in selecting which of a plurality of corresponding exception handlers should be used to handle a particular exception event. The exception controller 20 may include an exception vector table indicating the locations within the memory system 8 of various exception handling routines for processing exception levels. An example of an exception vector table is illustrated in FIG. 6. For different types of exception event (e.g. as is known from the ARM processor architecture synchronous, IRQ (normal interrupt), FIQ (fast interrupt), or error exception events), a plurality of different exception handling routines are identified by different address offset values. The exception handling routines can then be accessed at the memory address obtained by adding the corresponding address offset to a base address stored in a base address register of the exception handler. Different exception handlers can be provided to deal with different situations (for example, different system modes may require different exception handling routines).

When an exception event is targeted at the same level exception state as the current level exception state, then it can be useful to provide multiple different kinds of exception handlers (including at least one stack overflow exception handler) which are selected depending upon whether the current stack pointer when the exception event occurs is the base level stack pointer or one of the further level stack pointers. This is shown in FIG. 6 in which different address offsets are provided to identify different exception handling routines for the respective situations where the current stack pointer is one of the further level stack pointers and the current stack pointer is the base level stack pointer. Thus, the exception controller 20 can be responsive to the current value of the stack pointer selection register 42 to select which of the exception handlers is processed. This can be useful because, when a new exception event is targeted at the same exception state as the current exception state, then this indicates that a problem has occurred during execution of the previously processed exception handling routine, since an exception event not caused by the previously processed exception handling routine and targeted at the same level as the current exception state would not have interrupted the previously processed exception handling routine. Moreover, if the stack pointer selection register indicates that the current stack pointer is one of the further level stack pointers, then this indicates that the problem occurred during the initial portion of the previously processed exception handling routine, before the current stack pointer was switched to the base level stack pointer. A possible reason for the exception event could therefore be an overflow of the currently used further level stack 35-1, 35-2 or 35-3. If a normal exception handler is then loaded, then this handler may try to push variables on to the already overflowing stack and this could trigger yet another exception which may in turn itself want to load variables onto the stack, thus sending the system into recursive exception entry. To avoid such recursive calling of exception events, a stack overflow exception handler is provided for dealing with the rare cases of stack overflow and this exception handler is called when an exception event is called from the same exception level as the target exception event and the stack pointer selection register 42 indicates that the current stack pointer is one of the further level stack pointers. Thus, this situation can be distinguished from exceptions within the exception state that were using the base stack pointer without the need to use any registers, since the normal way to use registers would be to save old values in those registers on the stack, which in turn could lead to the recursion. Hence, even if the stack overflow exception handling routine cannot fix the stack, complete diagnostic information and a cleaner handling of the error situation can be achieved, as opposed to having the processor spinning in an endless loop of recursive exception entry.

Figure 7:
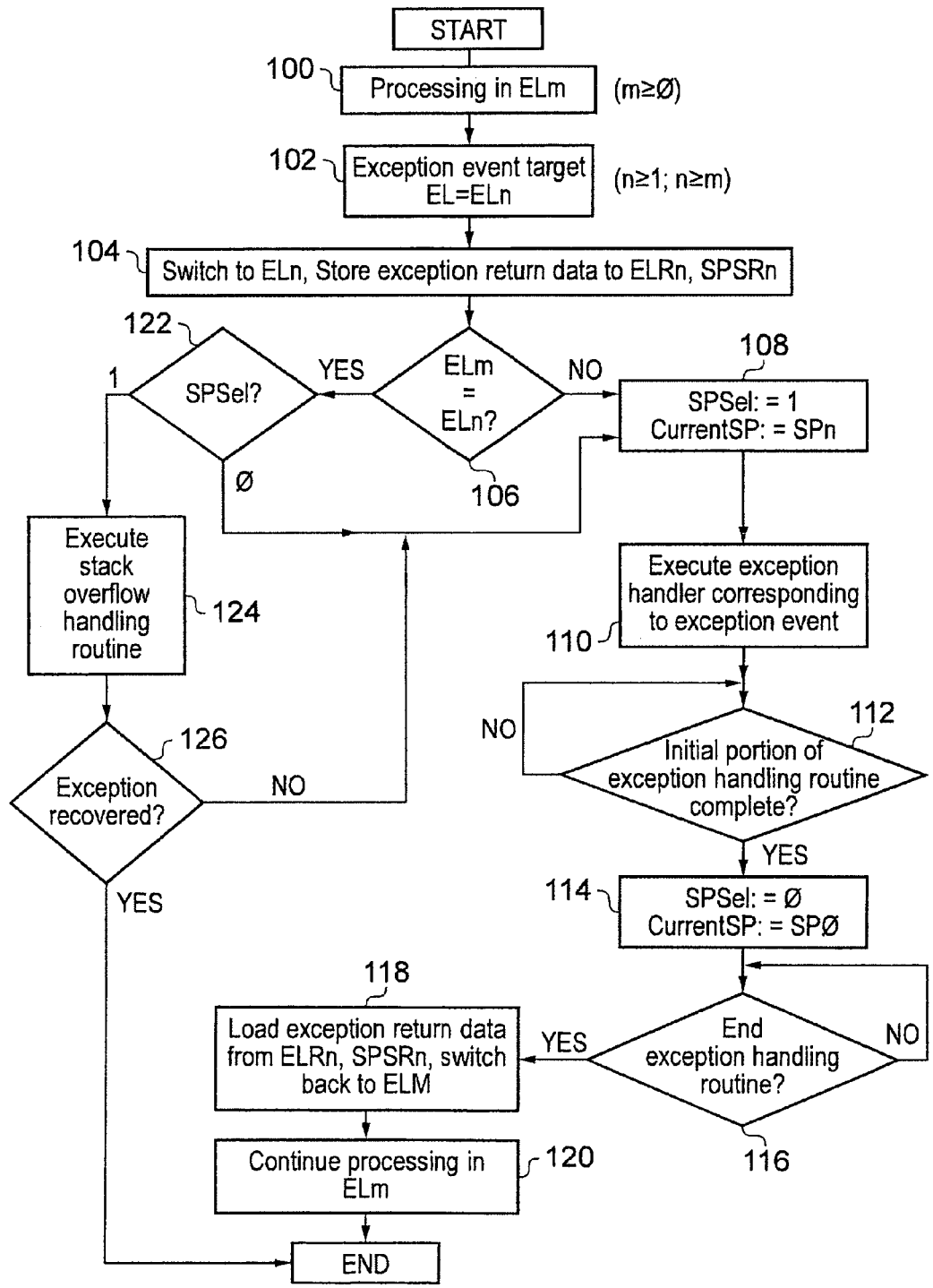
FIG. 7 illustrates a method for responding to an exception event.

FIG. 7 illustrates a method of handling an exception event. Initially, at step 100 the processing pipeline 4 is processing data in one of the exception states ELm (where m is an integer greater than, or equal, to zero). Thus, the pipeline 4 is processing data in any of the exception states. Then, at step 102 an exception event occurs which is targeted at a particular further level exception state ELn (where n is an integer greater than, or equal to, one; and n is also greater than, or equal to, m (if n was smaller than m then the exception event would not interrupt the current processing)). At step 104, the exception controller 20 places the processing pipeline 4 in the exception state ELn (or, if n=m, maintains the processing pipeline 4 in the same exception state as before) and stores exception return data in the exception link register 26 and saved process state register 28 corresponding to the target exception state ELn. The stored exception return data is data for enabling the system to return to the initial processing once processing of the exception event has completed.

At step 106, the exception controller 20 determines whether the exception state ELm at the time of the occurrence of the exception event is the same as the target exception state ELn. If the initial and target exception states are not the same, then at step 108 the stack pointer selection register 42 is set to a value of 1 indicating that the stack pointer associated with the target exception state SPn is the current stack pointer. The exception controller 20 then selects an exception handling routine corresponding to the exception event at step 110 and controls the processing pipeline 4 to start executing the exception handling routine. The processing pipeline 4 then continues to process the exception handling routine using the stack 35-$n$ associated with the target exception state ELn.

Processing of the exception handling routine then continues until step 112 at which it is determined that an initial portion of the exception handling routine is complete. One way of determining when the initial portion of the exception handling routine is complete is by providing the stack pointer selection instruction shown in FIG. 4. Alternatively, a counter can be provided within the stack pointer selection circuitry 40 to count a predetermined number of processing cycles or instructions from the start of the exception handling routine, and trigger the end of the initial portion once the counter reaches a predetermined value. The content of the base level stack pointer is then changed to point to the base level stack data store used for this exception level before switching to use the base level stack pointer. When the initial portion of the exception handling routine is completed, then at step 114, the stack pointer selection value stored in the stack pointer selection register 42 is set to zero and hence the current stack pointer becomes the base level stack pointer zero. The remainder of the exception handling routine is then processed using a respective base level stack data store 35-0', 35-0" or 35-0''' as the current stack. Processing then continues until the exception handling routine ends at step 116. Then, at step 118 the exception return data is loaded from the exception link register 26 and save process state register 28 corresponding to the target exception state ELn, and the processing pipeline 4 is then placed back in the initial exception state Elm. Processing then continues in the exception state Elm at step 120. The method then ends.

If, at step 106, the initial exception state ELm is the same as the target exception state ELn associated with the exception event, then at step 122 it is determined whether the stack pointer selection value stored in the stack pointer selection register 42 is one or zero (FIG. 7 is shown for the embodiment where zero indicates that the base level stack pointer is being used and one indicates that the further level stack pointer is being used, but clearly the meanings of zero and one can be reversed). If the stack pointer selection value is zero, then processing continues to steps 108-120. While the particular exception handling routine selected by the interrupt controller 120 when m and n are equal may be different to the exception handling routine selected when m and n are not equal (this will depend on the address offsets set in the vector table of the interrupt controller), the stack pointer processing shown in steps 108-120 is the same.

On the other hand, if the stack pointer selection value equals one at step 122, then at step 124 the exception controller 20 selects an exception vector corresponding to a stack overflow handling routine and controls the processing pipeline 4 to execute the stack overflow handling routine for handling stack overflows. This is because there is a risk of stack overflow of the stack 35-n. The stack overflow handling routine is able to at least prepare the system for a reset (by storing some context data to prevent that data being lost). At step 126 it is determined whether the stack overflow exception has been recovered. If recovery has been achieved and processing can continue as normal, then the method proceeds to step 108 at which the normal exception handling routine is executed in the same way as would have been the case if the stack pointer selection value was zero. However, if recovery has not been achieved, then processing then ends.

Thus, the technique shown in FIG. 7 enables a safe, dedicated, stack to be used for an initial portion of the exception handling routine to ensure that the exception handling routine is safely started. This avoids the exception handling routine failing to start due to overflow of the shared stack. After an initial portion of the exception handling routine is complete then the processing continues using a base level stack in order to conserve the resources of the dedicated safe stacks. In the unlikely event that an overflow could have occurred, then this condition can be identified from the fact that an exception targeted at the current exception state has been issued at a time where the stack pointer selection value indicates that the current stack is one of the further level stacks, and in this case an emergency stack overflow handling routine can be executed, irrespective of whether the stack actually has overflowed or not to guard against stack overflow.

If, at any time during the processing of FIG. 7, a further exception event occurs which the exception controller 20 determines is of a sufficiently high exception level to interrupt the current processing, then the method of FIG. 7 restarts with the previously executed processing being the processing performed in step 100 and the further exception event being the exception event occurring in step 102. For example, if an exception event occurs between steps 108 and 100 of FIG. 7 and is targeted at the same exception state as the current exception state, then this could trigger the processing of steps 106 and 122-126 because the stack pointer selection value will still be set to one to indicate that the current stack pointer is the further level stack pointer.

Figure 8:
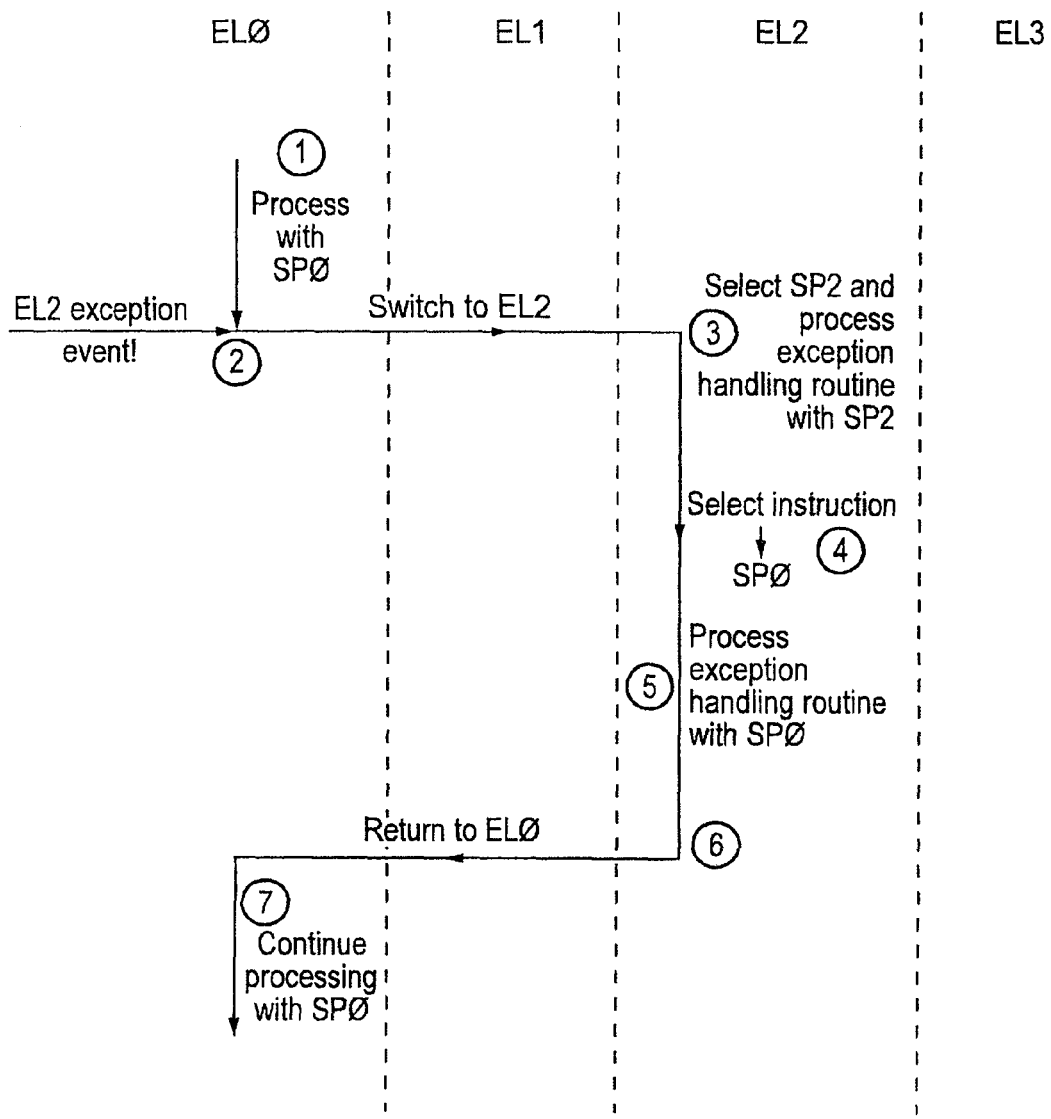
FIG. 8 schematically illustrates switching between exception states in response to an exception event.

FIG. 8 shows an example of processing an exception event in accordance with the method of FIG. 7. For example, at step 1 in FIG. 8 the processing is carried out in the base level exception state EL0 using the base level stack pointer SP0. At step 2 in FIG. 8 an exception event targeted at the further level exception state EL2 is detected by the exception controller 20. The system is then switched to the further level exception state EL2 and the exception return data is stored to the exception return registers 26, 28 associated with the exception state EL2 (according to step 104 of FIG. 7). At step 3 of FIG. 8 the stack pointer SP2 stored in the stack pointer register 30-2 is then selected and an exception handling routine processed using the stack 35-2 whose location is indicated by the stack pointer SP2. At step 4 of FIG. 8 a stack pointer selection instruction is encountered within the exception handling routine and so this switches the current stack pointer to the base level stack pointer SP0 stored in the base level stack pointer register 30-0 (in accordance with step 114 of FIG. 7). At step 5 of FIG. 8 the exception handling routine continues using the base level stack data store 35-0. At step 6 of FIG. 8 the exception handling routine ends and the processing returns to the original processing in the base level exception state EL0 using the exception return data stored in the exception return registers 26, 28 corresponding to exception state EL2. At step 7 of FIG. 8, the processing then continues in the base level exception state EL0 using the base level stack 35-0 indicated by the base level stack pointer SP0.

Figure 9:
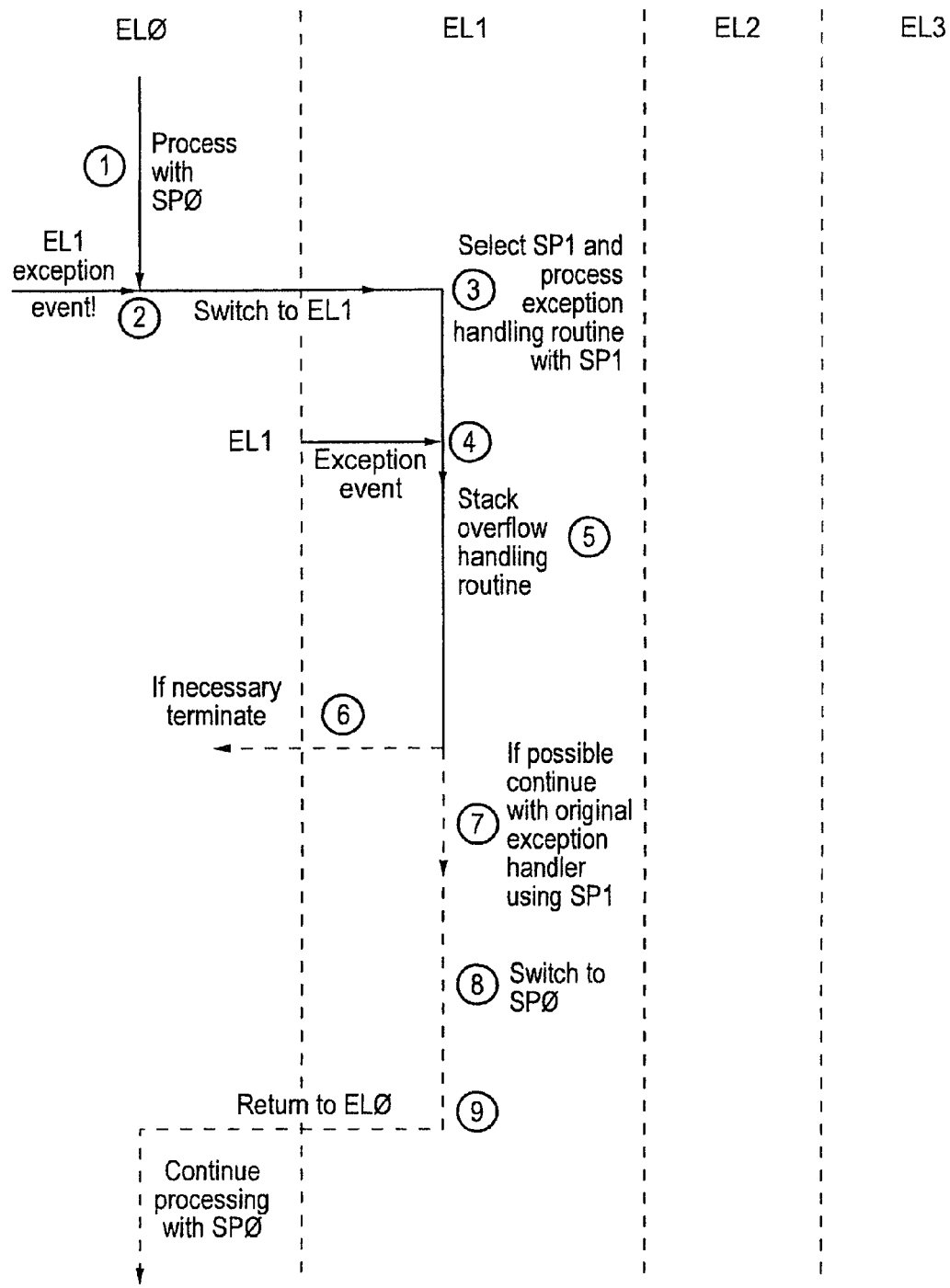
FIG. 9 schematically illustrates the processing of a stack overflow handling routine.

FIG. 9 illustrates another example of switching the exception states when processing an exception event, in accordance with the method of FIG. 7, in a case in which a stack overflow handling routine is required. At step 1 of FIG. 9, processing is carried out in the base level exception state EL0 using the base level stack pointer SP0. At step 2 of FIG. 9 an exception event targeted at the further level exception state EL1 is received. According to step 104 of FIG. 7, the system is switched to the further level exception state EL1 and the exception return data is stored in the exception return registers 26, 28 associated with the further level exception state EL1. The exception controller 20 then selects an exception handling routine associated with the exception event and processes the selected exception handling routine using the further level stack pointer SP1 stored in the stack pointer register 30-1 associated with the exception state EL1. However, before an initial portion of the exception handling routine has completed, another exception event occurs also targeted at the same exception state EL1. Thus, the method of FIG. 7 is restarted and at steps 106 and 122 of FIG. 7 it is determined that the current exception state EL1 and the target exception state EL1 are the same and that the stack pointer selection value stored in the stack pointer selection register 42 indicates that the current stack pointer is the further level stack pointer SP1. This means that, at step 5 of FIG. 9 (and in accordance with step 124 of FIG. 7) the stack overflow handling routine is executed as a precaution in case the exception event that occurred at step 4 of FIG. 9 indicated an overflow of the stack 35-1 associated with the current exception state. The stack overflow handling routine then either repairs the stack 35-1 or at least places the system in a state in which processing can be aborted without losing excessive amounts of data. If necessary, then the processing is terminated while providing suitable diagnostic information at step 6 of FIG. 9 (step 126 of FIG. 7). On the other hand, if processing can continue then the original exception handler is processed in the further level exception state EL1 at step 7 of FIG. 9 using the further level stack pointer SP1. After the initial portion of the exception handling routine is completed then at step 8 of FIG. 9 the current stack pointer is switched to the base level stack pointer SP0. At the end of the exception handling routine then at step 9 of FIG. 9 processing returns to the base level exception state using the exception return data loaded from the exception return registers 26, 28. Processing then continues in the base level exception state using the base level stack pointer SP0.

Figure 10:
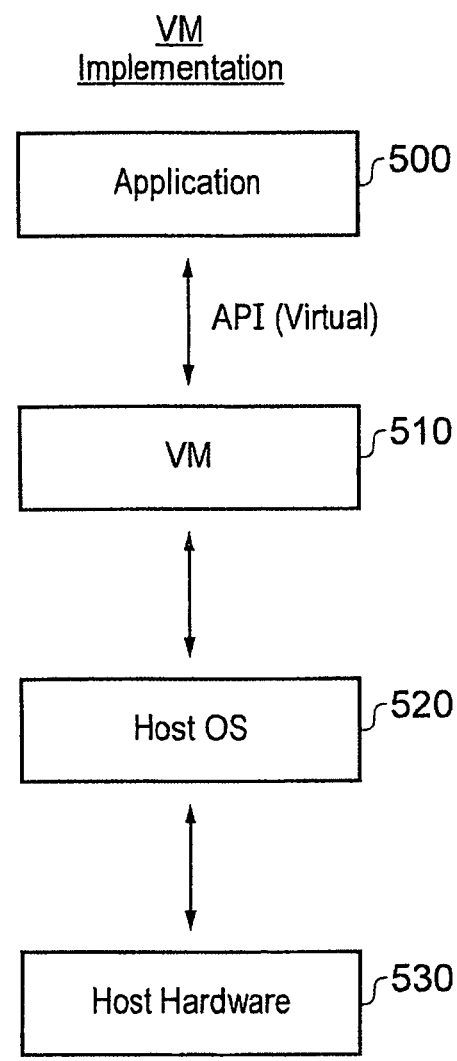
FIG. 10 schematically illustrates a virtual machine implementation.

FIG. 10 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Although illustrative embodiments of the invention have been described in detail herein, with reference to the accompanying drawings, it is to be understood that the invention is not limited to those precise embodiments, and that various changes and modifications can be made by one skilled in the art without parting from the scope of the invention that is defined by the appended claims.

I claim:

1. A data processing apparatus comprising:
    processing circuitry configured to process data, said processing circuitry having a plurality of exception states, said exception states including a base level exception state and at least one further level exception state;
    at least one exception return register for storing exception return data for controlling the processing circuitry to return from handling an exception event, the at least one further level exception state each having a corresponding exception return register dedicated for use by the processing circuitry when in the corresponding further level exception state;
    a base level stack pointer register for storing a base level stack pointer for use when said processing circuitry is in any of said exception states, said base level stack pointer indicating the location within a memory of a base level stack data store;
    at least one further level stack pointer register for storing at least one further level stack pointer, each further level stack pointer being dedicated for use when said processing circuitry is in a corresponding further level exception state and indicating the location within said memory of a corresponding further level stack data store; and
    stack pointer selection circuitry configured to select a current stack pointer and to control said processing circuitry to use a current stack data store indicated by said current stack pointer when processing data; wherein:
    when said processing circuitry is in said base level exception state, said stack pointer selection circuitry is configured to select said base level stack pointer as said current stack pointer; and
    when said processing circuitry is in one of said at least one further level exception state, said stack pointer selection circuitry is configured to select one of said base level stack pointer and the further level stack pointer corresponding to a current further level exception state as said current stack pointer, said processing circuitry continuing to use the exception return register corresponding to said current further level exception state irrespective of whether said current stack pointer is said base level stack pointer or said further level stack pointer.

2. The data processing apparatus according to claim 1, wherein said stack pointer selection circuitry is responsive to an exception event associated with a target further level exception state to select said further level stack pointer corresponding to said target further level exception state as said current stack pointer.

3. The data processing apparatus according to claim 2, wherein said processing circuitry is responsive to said exception event to process an exception handling routine in said target further level exception state; and
    said stack pointer selection circuitry is controlled to switch said current stack pointer from said further level stack pointer corresponding to said target further level exception state to said base level stack pointer after said processing circuitry has completed an initial portion of said exception handling routine.

4. The data processing apparatus according to claim 3, wherein said exception handling routine includes an instruction for controlling said stack pointer selection circuitry to switch said current stack pointer from said further level stack pointer corresponding to said target further level exception state to said base level stack pointer.

5. The data processing apparatus according to claim 1, comprising a stack pointer selection register configured to store a stack pointer selection value indicating whether said current stack pointer is said base level stack pointer or said further level stack pointer corresponding to said current further level exception state.

6. The data processing apparatus according to claim 5, wherein said stack pointer selection circuitry selects said current stack pointer in dependence on said stack pointer selection value when said processing circuitry is in one of said at least one further level exception state.

7. The data processing apparatus according to claim 6, wherein when said processing circuitry is in one of said at least one further level exception state, said stack pointer selection circuitry is configured to:
    (i) select said base level stack pointer as said current stack pointer when said stack pointer selection value has a first value; and
    (ii) select said further level stack pointer corresponding to said current further level exception state as said current stack pointer when said stack pointer selection value has a second value.

8. The data processing apparatus according to claim 6, wherein said processing circuitry is responsive to a stack pointer selection instruction to write an updated stack pointer selection value to said stack pointer selection register.

9. The data processing apparatus according to claim 5, comprising an exception controller responsive to an exception event to control said processing circuitry to process an exception handling routine corresponding to said exception event, at least one exception event having a plurality of corresponding exception handling routines;
    wherein on occurrence of said at least one exception event, said exception controller selects one of said plurality of corresponding exception handling routines for processing by said processing circuitry in dependence on said stack pointer selection value.

10. The data processing apparatus according to claim 9, wherein said plurality of corresponding exception handling routines includes a stack overflow handling routine for handling a stack overflow of said at least one further stack data store, and said exception controller is configured to control said processing circuitry to process said stack overflow handling routine on occurrence of said at least one exception event when a target further level exception state associated with said at least one exception event is the same as said current further level exception state of said processing circuitry and said stack pointer selection value indicates that said further level stack pointer is said current stack pointer.

11. The data processing apparatus according to claim 1, further comprising said memory.

12. A data processing apparatus comprising:
processing means for processing data, said processing means having a plurality of exception states, said exception states including a base level exception state and at least one further level exception state;
at least one exception return register means for storing exception return data for controlling the processing means to return from handling an exception event, the at least one further level exception state each having a corresponding exception return register means dedicated for use by the processing means when in the corresponding further level exception state;
a base level stack pointer register means for storing a base level stack pointer for use when said processing means is in any of said exception states, said base level stack pointer indicating the location within a memory means of a base level stack data store means;
at least one further level stack pointer register means for storing at least one further level stack pointer, each further level stack pointer being dedicated for use when said processing means is in a corresponding further level exception state and indicating the location within said memory means of a corresponding further level stack data store means; and
stack pointer selection means for selecting a current stack pointer and for controlling said processing means to use a current stack data store means indicated by said current stack pointer when processing data; wherein:
when said processing means is in said base level exception state, said stack pointer selection means is configured to select said base level stack pointer as said current stack pointer; and
when said processing means is in one of said at least one further level exception state, said stack pointer selection means is configured to select one of said base level stack pointer and the further level stack pointer corresponding to a current further level exception state as said current stack pointer, said processing means continuing to use the exception return register means corresponding to said current further level exception state irrespective of whether said current stack pointer is said base level stack pointer or said further level stack pointer.

13. A method of data processing comprising the steps of:
processing data in one of a plurality of exception states, said exception states including a base level exception state and at least one further level exception state;
in response to an exception event, storing in at least one exception return register exception return data for controlling a return from handling the exception event, the at least one further level exception state each having a corresponding exception return register dedicated for use when processing in the corresponding further level exception state;
storing a base level stack pointer for use when said processing step is in any of said exception states, said base level stack pointer indicating the location within a memory of a base level stack data store;
storing at least one further level stack pointer, each further level stack pointer being dedicated for use when said processing step is in a corresponding further level exception state and indicating the location within said memory of a corresponding further level stack data store; and
selecting a current stack pointer and controlling said processing step to use a current stack data store indicated by said current stack pointer when processing data; wherein:
when said processing step processes data in said base level exception state, said selecting step selects said base level stack pointer as said current stack pointer; and
when said processing step processes data in one of said at least one further level exception state, said selecting step selects one of said base level stack pointer and the further level stack pointer corresponding to a current further level exception state as said current stack pointer, said processing step continuing to use the exception return register corresponding to said current further level exception state irrespective of whether said current stack pointer is said base level stack pointer or said further level stack pointer.

14. A data processing apparatus comprising:
processing circuitry configured to process data in one of a plurality of exception states including a base level exception state and at least one further level exception state;
a base level stack pointer register for storing a base level stack pointer indicating the location within a memory of a base level stack data store;
at least one further level stack pointer register for storing at least one further level stack pointer indicating the location within said memory of at least one further level stack data store, the at least one further level exception state each having a corresponding further level stack pointer; and
an exception controller responsive to an exception event associated with a target further level exception state to trigger said processing circuitry to process an exception handling routine in said target further level exception state using the further level stack data store indicated by the further level stack pointer corresponding to said target further level exception state;
wherein said processing circuitry is configured, after processing an initial portion of said exception handling routine, to process a remainder of said exception handling routine in said target further level exception state using said base level stack data store indicated by said base level stack pointer.

15. A data processing apparatus comprising:
processing means for processing data in one of a plurality of exception states including a base level exception state and at least one further level exception state;
a base level stack pointer register means for storing a base level stack pointer indicating the location within a memory means of a base level stack data store means;
at least one further level stack pointer register means for storing at least one further level stack pointer indicating the location within said memory means of at least one further level stack data store means, the at least one further level exception state each having a corresponding further level stack pointer; and
exception controlling means for triggering, in response to an exception event associated with a target further level exception state, said processing means to process an exception handling routine in said target further level exception state using the further level stack data store means indicated by the further level stack pointer corresponding to said target further level exception state;
wherein said processing means is configured, after processing an initial portion of said exception handling routine, to process a remainder of said exception handling routine in said target further level exception state using said base level stack data store means indicated by said base level stack pointer.

16. A method of data processing comprising the steps of:

processing data in one of a plurality of exception states including a base level exception state and at least one further level exception state;

storing a base level stack pointer indicating the location within a memory of a base level stack data store;

storing at least one further level stack pointer indicating the location within said memory of at least one further level stack data store, the at least one further level exception state each having a corresponding further level stack pointer;

in response to an exception event associated with a target further level exception state, triggering processing of an exception handling routine in said target further level exception state using the further level stack data store indicated by the further level stack pointer corresponding to said target further level exception state; and after processing an initial portion of said exception handling routine, processing a remainder of said exception handling routine in said target further level exception state using said base level stack data store indicated by said base level stack pointer.

17. A computer program stored on a non-transitory computer readable storage medium containing instructions, that when executed by a data processing apparatus, provides a virtual machine which provides an instruction execution environment corresponding to the apparatus of claim 1.

* * * * *